United States Patent
Kouwa et al.

(10) Patent No.: US 6,943,532 B1
(45) Date of Patent: Sep. 13, 2005

(54) VOLTAGE CONTROL APPARATUS FOR VEHICLE GENERATOR HAVING A LIGHT EMITTING DIODE

(75) Inventors: Tatsuki Kouwa, Tokyo (JP); Katsuhiro Sasaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/688,350

(22) Filed: Oct. 16, 2000

(30) Foreign Application Priority Data

Apr. 11, 2000 (JP) ............................. 2000-109030

(51) Int. Cl.[7] .......................... H02H 7/06; H02P 11/00; H02P 9/00
(52) U.S. Cl. ........................................ 322/28; 322/24
(58) Field of Search ............................. 322/28, 22, 23, 322/24, 25, 26, 27

(56) References Cited

U.S. PATENT DOCUMENTS

| | | | |
|---|---|---|---|
| 4,275,344 A * | 6/1981 | Mori et al. ................... | 320/123 |
| 4,295,087 A | 10/1981 | Morishita et al. | |
| 4,306,184 A * | 12/1981 | Iwaki et al. ................... | 322/90 |
| 4,309,648 A * | 1/1982 | Morishita ..................... | 322/28 |
| 4,336,487 A * | 6/1982 | Tanaka et al. ................. | 322/99 |
| 4,379,990 A | 4/1983 | Sievers et al. | |
| 4,381,483 A * | 4/1983 | Muto et al. ................... | 322/99 |
| 4,418,311 A | 11/1983 | Torii et al. | |
| 4,549,128 A | 10/1985 | Morishita et al. | |
| 4,642,548 A * | 2/1987 | Mashino ....................... | 322/25 |
| 4,658,200 A * | 4/1987 | Kouge .......................... | 322/25 |
| 4,665,354 A * | 5/1987 | Sada et al. .................... | 320/64 |
| 4,687,983 A * | 8/1987 | Beyn ........................... | 320/123 |
| 4,755,737 A * | 7/1988 | Komurasaki et al. ........ | 320/162 |
| 4,914,374 A * | 4/1990 | Iwatani et al. ................ | 322/28 |
| 5,266,882 A * | 11/1993 | Morishita ..................... | 320/162 |
| 5,280,232 A * | 1/1994 | Kohl et al. .................... | 320/137 |
| 5,563,497 A * | 10/1996 | Iwatani et al. ................ | 322/99 |
| 5,581,172 A * | 12/1996 | Iwatani et al. ................ | 322/28 |
| 5,719,487 A * | 2/1998 | Sato et al. ..................... | 322/28 |
| 5,780,995 A * | 7/1998 | Maggioni et al. ............. | 322/8 |
| 6,313,613 B1 * | 11/2001 | Iwatani et al. ................ | 322/12 |

FOREIGN PATENT DOCUMENTS

| | | | | |
|---|---|---|---|---|
| GB | 1603886 | 12/1981 | | |
| JP | 52-068911 | 6/1977 | | |
| JP | 61-046200 | 3/1986 | | |
| JP | 402036734 A | * | 2/1990 | ............. 307/107 |
| JP | 06 237541 | 8/1994 | | |

(Continued)

OTHER PUBLICATIONS

Korean Office Action dated Apr. 3, 2003.

*Primary Examiner*—Darren Schuberg
*Assistant Examiner*—Julio C. Gonzalez
(74) *Attorney, Agent, or Firm*—Sughrue Mion, PLLC (57) ABSTRACT

A voltage control apparatus 1 for a vehicle generator 2 has an input terminal L for inputting the voltage of a battery 5 through an ignition switch 3 and a light emitting element (light emitting diode 4) connected in series with the ignition switch and driven by a low dissipation power, and starts the excitation of the rotor coil 201 of the vehicle generator 2 when the voltage at the input terminal L exceeds a predetermined value. A resistor 115 for limiting the current flowing through the light emitting diode 4 is disposed between an element 114 within the voltage control apparatus 1 for driving the light emitting diode 4 and the input terminal L.

4 Claims, 6 Drawing Sheets

FOREIGN PATENT DOCUMENTS

| JP | HEI 07-15886 | 1/1995 |
| JP | 7-298515 A | 11/1995 |
| JP | 09-047091 | 2/1997 |
| JP | 2707616 | 10/1997 | ............ H02J 7/24 |

* cited by examiner

VOLTAGE CONTROL APPARATUS FOR VEHICLE GENERATOR HAVING A LIGHT EMITTING DIODE

BACKGROUND OF THE INVENTION

The present invention relates to a voltage control apparatus for a vehicle generator wherein an ignition switch and a charge lamp are connected in series so that a single input terminal is commonly used for these elements.

Figure 6:
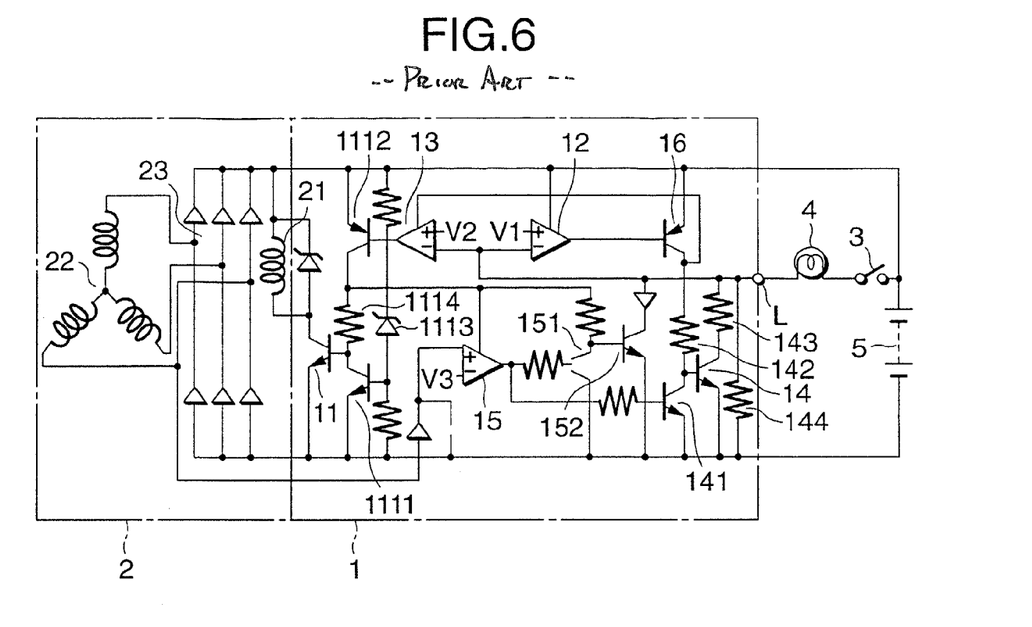
FIG. 6 is a circuit diagram showing a conventional voltage control apparatus for a vehicle generator.

As a voltage control apparatus for a vehicle generator which has an input terminal for inputting a battery voltage through an ignition switch and a charge lamp and starts the operation when the voltage at the input terminal exceeds a predetermined value, there is known one disclosed in Japanese Patent No. 2707616. FIG. 6 shows a circuit diagram of the voltage control apparatus disclosed in the Japanese Patent.

The voltage control apparatus 1 shown in FIG. 6 is arranged in a manner that the voltage control apparatus includes an input terminal L for inputting the voltage of a battery 5 through an ignition switch 3 and a charge lamp 4 connected in series with the ignition lamp and starts the excitation of a rotary coil 21 of a vehicle generator 2 when the voltage at the input terminal L exceeds a predetermined value. The voltage control apparatus 1 further includes a comparison means 12 which generates an output signal when the voltage at the input terminal L exceeds another predetermined value lower than the aforesaid predetermined value, and a switch means 14 which operates in response to the output signal thereby to connect a leak compensation resistor 143 between the input terminal L and the ground.

To be more concrete, the voltage control apparatus 1 shown in FIG. 6 includes comparators 12, 13. The voltage of the input terminal L is applied to each of the negative "−" terminals of these comparators. Constant voltages V1, V2 are applied to the positive "+", terminals of the comparators 12, 13, respectively, wherein V1<V2. A transistor 16 is connected to the output terminal of the comparator 12. A transistor 14 serving as a switch means is turned on in response to the output of the transistor 16 applied through a resistor 142. A transistor 1112 is connected to the output terminal of the comparator 13. A power transistor 11 is turned on in response to the output of the transistor 1112 applied through a resistor 1114.

The transistor 14 and a transistor 152 are connected to a comparator 15 through transistors 141, 151, respectively. When the vehicle generator 2 starts the electric power generation operation, the voltage generated by the generator exceeds a constant voltage V3, so that the comparator 15 turns off the transistors 14, 152. In the figure, reference numerals 22, 23 depict the stator coil and the full-wave rectifier of the vehicle generator 2 respectively. A resistor 144 provided between the input terminal L and the ground serves to lower the voltage at the input terminal L to the ground level upon the normal opening operation of the ignition switch 3.

During the electric power generation operation, the power transistor 11 is turned on and off in response to a transistor 1111. A zener diode 1113 is provided on the base side of the transistor 1111.

Figure 7:
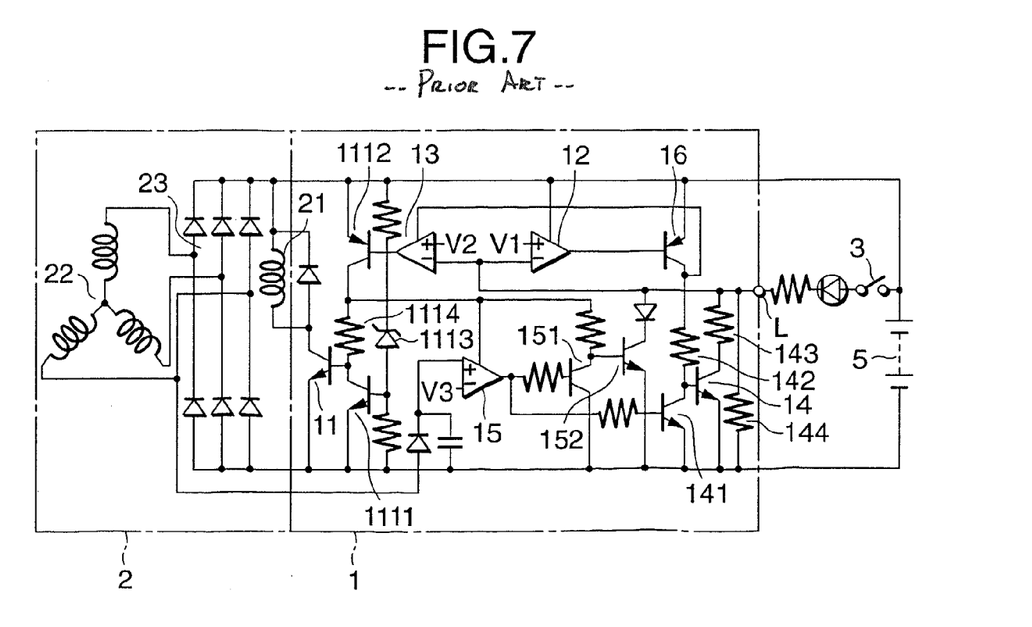
FIG. 7 is a circuit diagram showing a conventional voltage control apparatus for a vehicle generator.

An example of the conventional voltage control apparatus for a vehicle generator is shown in FIG. 7 in which a light emitting element such as a light emitting diode driven with a low dissipation power is employed as the charge lamp. When the light emitting diode etc. is employed as the charge lamp as shown in FIG. 7, it is required to mount a current limit resistor in series with the light emitting diode etc. on a vehicle side in order to prevent the occurrence of such a phenomenon that a transistor 152 for turning on the light emitting diode etc. is broken by an overcurrent.

However, when the current limit resistor is mounted on the vehicle side, the arrangement of the apparatus on the vehicle side becomes complicated. Further, even in the case where the current limit resistor is inserted on the vehicle side, there arises a problem that, when a high voltage such as a battery voltage etc. is directly applied to the input terminal L due to the abnormality of the vehicle wiring etc., the transistor for driving the light emitting element (light emitting diode etc.) driven with a low dissipation power may be broken by an overcurrent.

Further, there is a problem that a dedicated element such as a transistor etc. for lightening the light emitting element is required and that the light emitting element may always be kept in a lightened state by a current flowing into the input terminal L for starting the operation of the voltage control apparatus.

SUMMARY OF THE INVENTION

Accordingly, the present invention has been made in order to obviate the aforesaid problems of the prior art, and an object of the present invention is to provide a voltage control apparatus for a vehicle generator having a stable starting circuit which can start the voltage control circuit without breaking the voltage control apparatus even in an abnormal case that a high voltage is directly applied to the input terminal L of the voltage control apparatus.

Further, another object of the invention is to provide a voltage control apparatus for a vehicle generator which eliminates a dedicated element such as a transistor etc. which has been employed merely to turning on and off the light emitting element and can turn on and off the light emitting element with a simple circuit arrangement.

Furthermore, still another object of the invention is to provide a voltage control apparatus for a vehicle generator which can prevent the occurrence of such a phenomenon that the light emitting element is always kept in a lightened state by a current for starting the operation of the voltage control apparatus which flows into the voltage control apparatus from the input terminal L through the light emitting element.

The invention according to aspect 1 is characterized in that in a voltage control apparatus for a vehicle generator which has an input terminal for inputting the voltage of a battery through an ignition switch and a light emitting element connected in series with the ignition switch and driven by a low dissipation power and which starts the excitation of the rotor coil of the vehicle generator when the voltage at the input terminal exceeds a predetermined value, wherein a resistor for limiting the current flowing through the light emitting element is disposed between an element within the voltage control apparatus for driving the light emitting element and the input terminal.

The invention according to aspect 2 is characterized in that in a voltage control apparatus for a vehicle generator which has an input terminal for inputting a voltage of a battery through an ignition switch and a light emitting element connected in series with the ignition switch and driven by a low dissipation power and which starts excitation of a rotor coil of the vehicle generator when a voltage at the input terminal exceeds a predetermined value, wherein the light emitting element is lightened by a current itself which is inputted into the input terminal for starting the operation of the voltage control apparatus.

The invention according to aspect 3 is characterized, in the voltage control apparatus for a vehicle generator according to aspect 2, in that the light emitting element is coupled through the ignition switch to the base terminal of an NPN transistor for starting the operation of the voltage control apparatus so that the light emitting element is turned on by a current flowing into the base terminal. The invention according to aspect 4 is characterized in that in a voltage control apparatus for a vehicle generator which has an input terminal for inputting a voltage of a battery through an ignition switch and a light emitting element connected in series with the ignition switch and driven by a low dissipation power and which starts excitation of a rotor coil of the vehicle generator when a voltage at the input terminal exceeds a predetermined value, wherein a circuit for detecting the voltage of the input terminal and starting the voltage control apparatus is arranged to be shutdown or inoperable after the vehicle generator starts the electric power generation operation.

The invention according to aspect 5 is characterized, in the voltage control apparatus for a vehicle generator according to aspect 4, in that after the circuit for detecting the voltage of the input terminal and starting the voltage control apparatus is shutdown after the vehicle generator starts electric power generation operation, the operation of a starting circuit for the voltage control apparatus is maintained by the output of one phase of the vehicle generator.

The invention according to aspect 6 is characterized in that in a voltage control apparatus for a vehicle generator which has an input terminal for inputting a voltage of a battery through an ignition switch and a light emitting element connected in series with the ignition switch and driven by a low dissipation power and which starts excitation of a rotor coil of the vehicle generator when a voltage at the input terminal exceeds a predetermined value, wherein a circuit for detecting the voltage of the input terminal and starting the voltage control apparatus includes a field effect transistor.

The invention according to aspect 7 is characterized in that a light emitting diode is used as the light emitting element.

DETAILED DESCRIPTION OF THE PREFERRED EMBODIMENTS

First Embodiment

Figure 1:
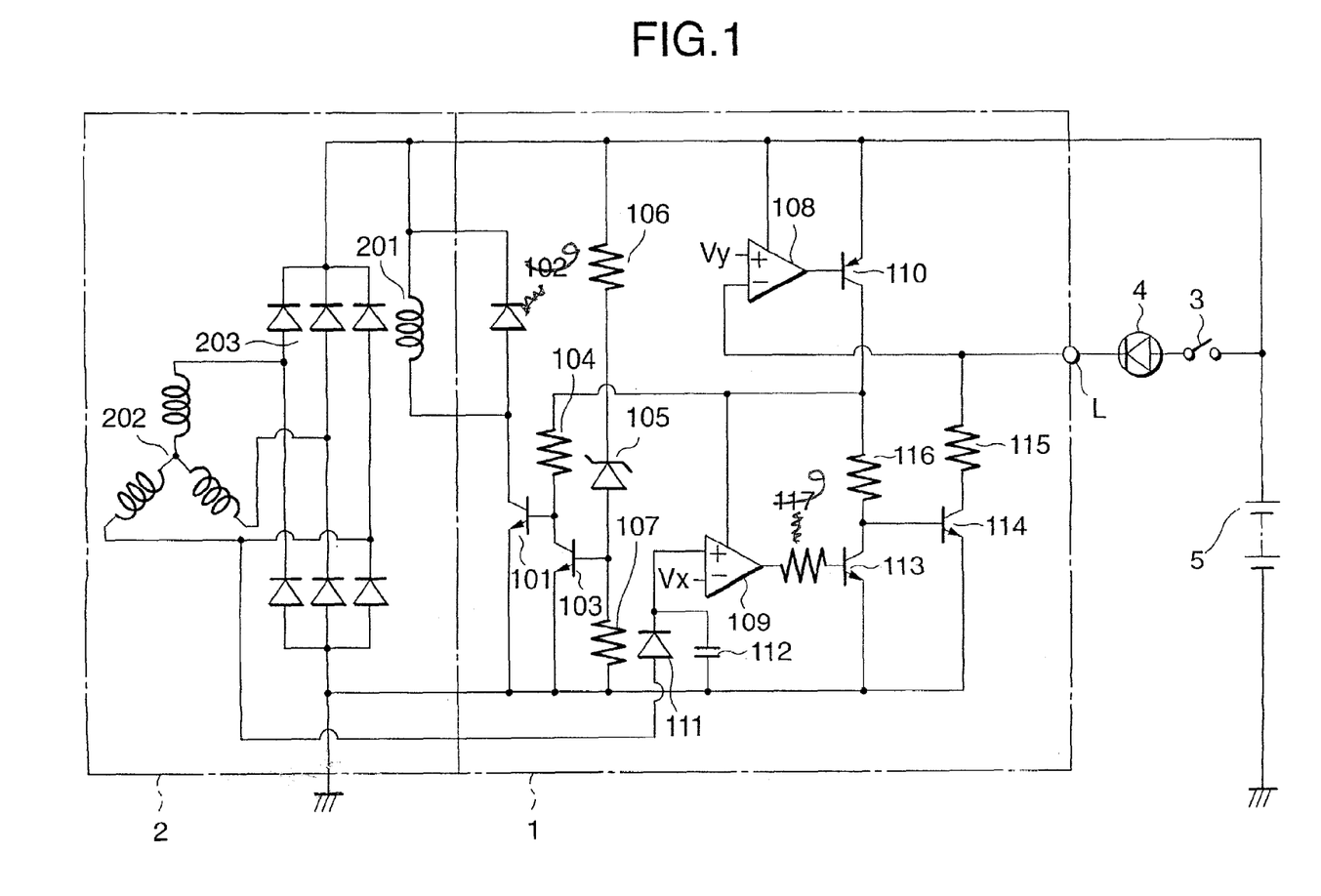
FIG. 1 is a circuit diagram showing a voltage control apparatus for a vehicle generator according to the first embodiment of the invention.

FIG. 1 is a circuit diagram showing a voltage control apparatus for a vehicle generator according to the first embodiment of the invention. The voltage control apparatus 1 shown in FIG. 1 has an input terminal L for inputting the voltage of a battery 5 through an ignition switch 3 and a light emitting element (light emitting diode 4) driven by a low dissipation power which is connected in series with the ignition switch. The voltage control apparatus is arranged to start the excitation of the rotor coil 201 of a vehicle generator 2 when the voltage of the input terminal L exceeds a predetermined value.

The voltage control apparatus 1 includes a current limit resistor 115 connected in series with a transistor 114 between the input terminal L and the collector of the transistor 114 for lightening the light emitting diode 4.

The voltage control apparatus 1 further includes a comparator 108 having a negative "−" terminal to which the voltage of the input terminal L is applied and a positive "+" terminal to which a constant voltage Vy is inputted.

When the ignition switch 3 is closed, the battery voltage is applied to the negative terminal of the comparator 108 through the light emitting diode 4 thereby to change the output of the comparator 108 from a high level to a low level, so that a transistor 110 is turned on. When the transistor 110 is turned on, the voltage control apparatus 1 is started. Thus, a transistor 101 is supplied with a base current through a resistor 104 and hence a rotor coil 201 is supplied with a field current, whereby the vehicle generator 2 is placed in a state of capable of generating electric power.

When the vehicle generator 2 is in a state of before starting an electric power generation operation, a comparator 109 is supplied at its positive "+" terminal with zero voltage, so that the comparator 109 outputs a low level thereby to turn off a transistor 103. Thus, the transistor 114 for driving the light emitting diode 4 is supplied with a base current through a resistor 116 and turned on, whereby the light emitting diode 4 is turned on by the current flowing through the resistor 115.

In this case, since the voltage of the input terminal L of the voltage control apparatus 1 is kept at almost same voltage as that of the battery 5 by the resistor 115, the negative terminal of the comparator 108 is kept to be supplied with a voltage higher than the voltage Vy, so that both the transistors 101 and 114 are surely kept to be supplied with the base current.

Further, even when the input terminal L is directly applied with the voltage of the battery 5 due to the abnormality of the wiring of the input terminal L, the short-circuit of the light emitting diode 4 etc. of the voltage control apparatus 1, since the current flowing into the collector of the transistor 114 is limited by the resistor 115, the transistor 114 is prevented from being broken.

When the vehicle generator 2 starts the electric power generation operation, since both a diode 111 and a capacitor 112 receive the output voltage of one phase of the generator, the voltage of the positive terminal of the comparator 109 becomes larger than the voltage Vx of the negative terminal thereof. Thus, since the output of the comparator 109 is changed from a low level to a high level, the transistor 113 is tuned on and so the transistor 114 is turned off thereby to turn off the light emitting diode 4.

Since a transistor 103 and the transistor 101 are switched in response to a predetermined voltage which is obtained by dividing the output voltage of the vehicle generator 2 by resistors 106, 107 and a zener diode 105, the current flowing through the rotor coil 201 is intermittently controlled and so controlled to a predetermined value.

Figure 2:
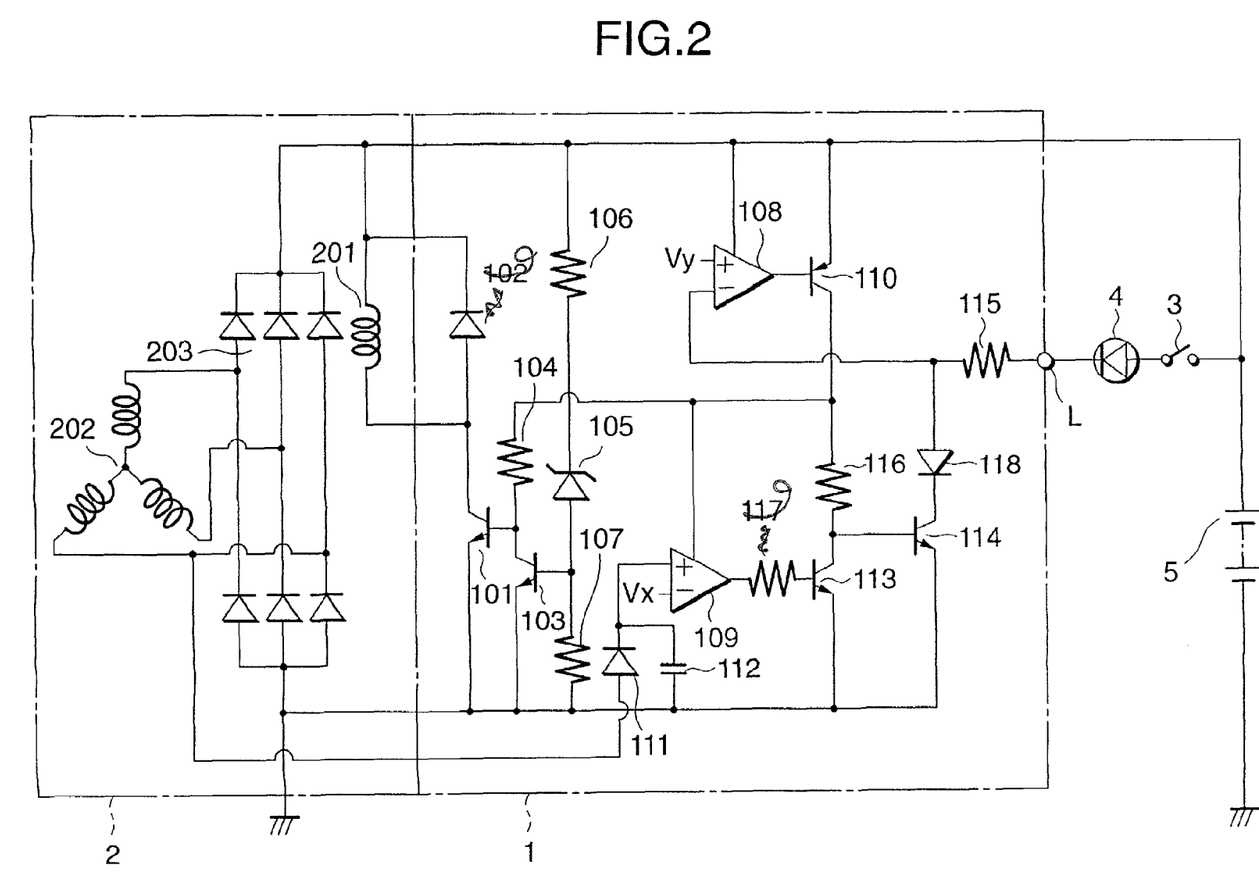
FIG. 2 is a circuit diagram showing a voltage control apparatus for a vehicle generator according to the first embodiment of the invention.

When the current limit resistor 115 is disposed in a manner as shown in FIG. 2, the same technical effect as the arrangement of FIG. 1 can be attained.

As described above, according to the voltage control apparatus for a vehicle generator of the first embodiment, in a case where the light emitting element such as the light emitting diode driven by a low dissipation power is employed as the charge lamp, the resistor for limiting the current flowing through the light emitting element is disposed between the input terminal and the element for driving the light emitting element within the voltage control apparatus. Thus, the voltage control circuit is prevented from being broken even in an abnormal case that the output voltage of the battery is directly applied to the input terminal, and the stable starting circuit for the voltage control circuit can be arranged with the simple configuration.

Second Embodiment

The second embodiment is arranged in a manner that in the voltage control apparatus for a vehicle generator which has an input terminal L for inputting the voltage of a battery through an ignition switch and a light emitting element (light emitting diode etc.) connected in series with the ignition switch and driven by a low dissipation power and which starts its operation when the voltage at the input terminal L exceeds a predetermined value, the light emitting element is lightened by the current itself which is inputted into the input terminal L for starting the operation of the voltage control apparatus thereby to eliminate a dedicated element for lightening the light emitting element.

Figure 3:
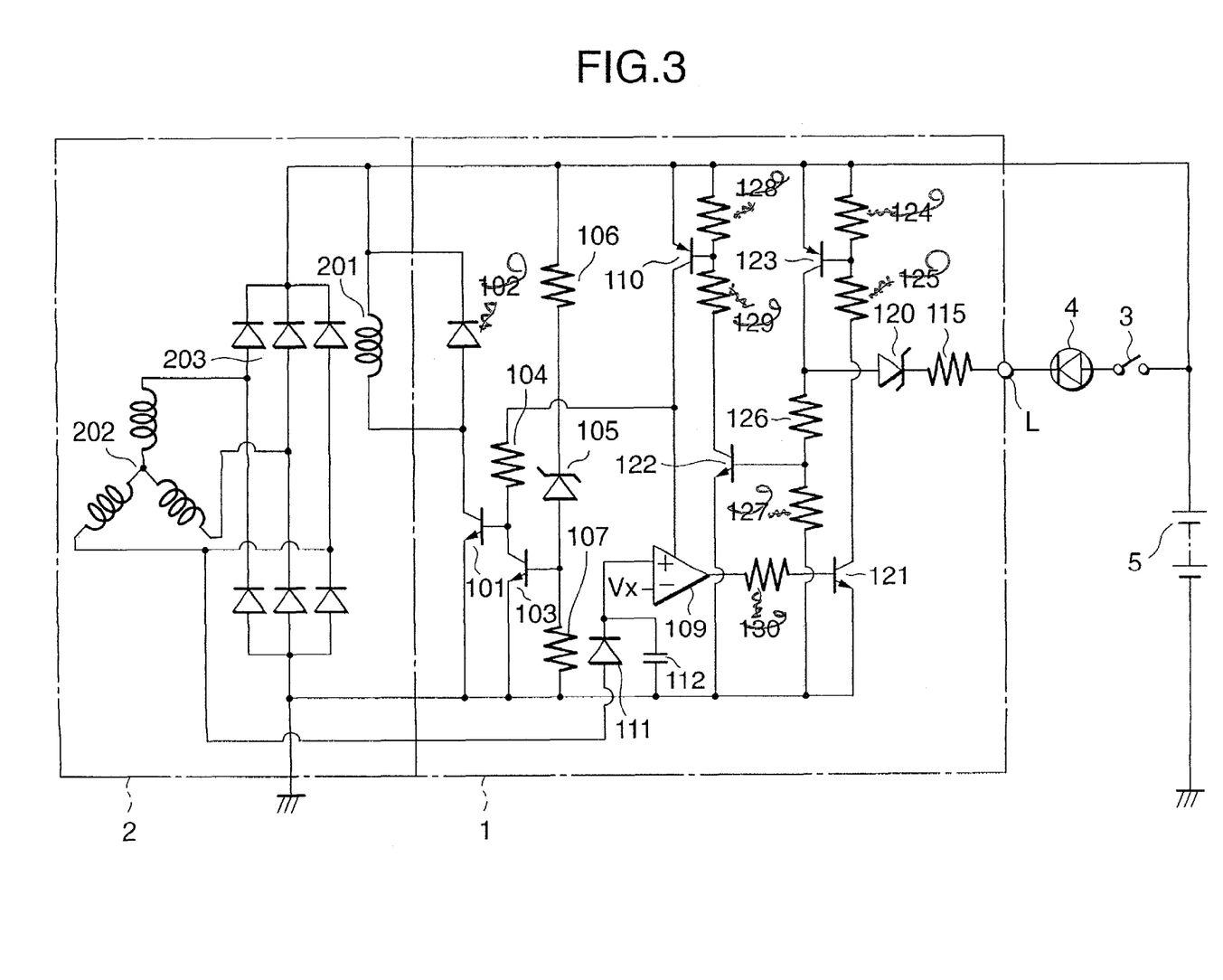
FIG. 3 is a circuit diagram showing a voltage control apparatus for a vehicle generator according to the second embodiment of the invention.

FIG. 3 is a circuit diagram showing the voltage control apparatus for a vehicle generator according to the second embodiment. In FIG. 3, when an ignition switch 3 is closed, a transistor 122 is supplied with a base current through a light emitting diode 4 serving as a charge lamp, a current limit resistor 115, a zener diode 120 and a resistor 126, so that the transistor 122 and a transistor 110 are turned on. Thus, a transistor 101 is supplied with a base current through a resistor 104 and so turned on, and hence a rotor coil 201 is supplied with a field current, whereby the vehicle generator 2 is placed in a state of capable of generating electric power.

Further, the light emitting diode 4 is lightened by the base current of the transistor 122 which is supplied to the input terminal L through the ignition switch 3 for driving the transistor 122.

When the vehicle generator 2 starts the electric power generation operation, like the first embodiment, since the output of a comparator 109 is changed from a low level to a high level, a transistor 121 is tuned on, so that a transistor 123 is also turned on. Thus, since the battery voltage is applied to the collector terminal of the transistor 123, the current having been supplied to the light emitting diode 4 is cut off, whereby the light emitting diode 4 is turned off.

Further, since the transistor 122 is supplied with the base current due to the turning-on of the transistor 123, the circuit for supplying the base current for the transistor 101 is prevented from being shut down or inoperable.

Since the voltage control operation of the voltage control apparatus of this embodiment is same as that of the first embodiment, the explanation of the voltage control operation of the voltage control apparatus of this embodiment will be omitted.

As described above, according to the voltage control apparatus for a vehicle generator of the second embodiment, the element such as a dedicated transistor etc. which has been employed merely to turning on and off the light emitting element driven with a low dissipation power can be eliminated and the light emitting element can be turned on and off with the simple circuit arrangement.

Third Embodiment

The third embodiment is arranged in a manner that in the voltage control apparatus for a vehicle generator which has an input terminal L for inputting the voltage of a battery through an ignition switch and a light emitting element (light emitting diode etc.) connected in series with the ignition switch and driven by a low dissipation power and which starts its operation when the voltage at the input terminal exceeds a predetermined value, the circuit for detecting the voltage of the input terminal L and starting the voltage control apparatus is arranged to be shutdown or inoperable after the vehicle generator starts the electric power generation operation.

Figure 4:
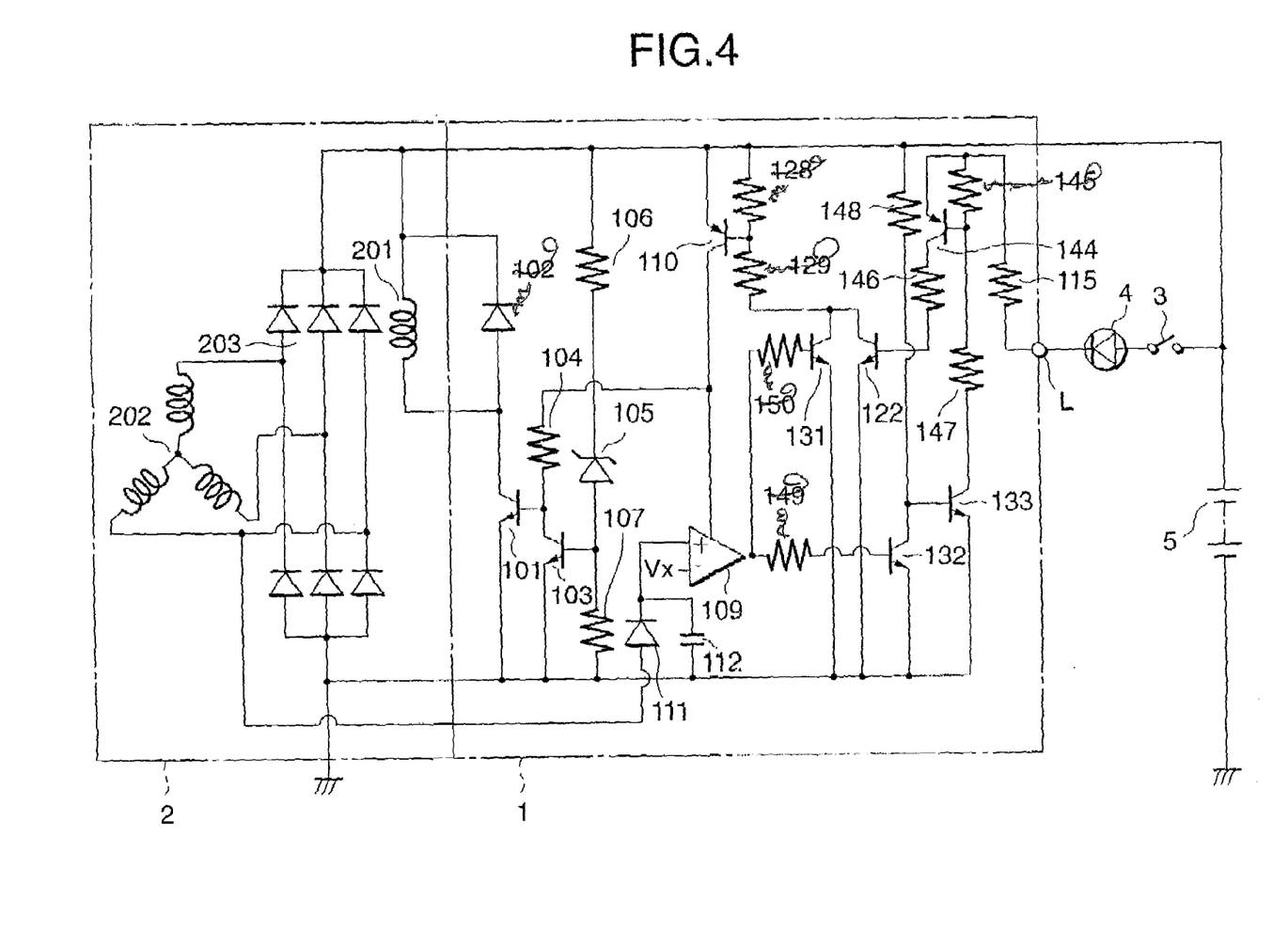
FIG. 4 is a circuit diagram showing a voltage control apparatus for a vehicle generator according to the third embodiment of the invention.

FIG. 4 is a circuit diagram showing the voltage control apparatus for a vehicle generator according to the third embodiment.

In FIG. 4, when an ignition switch 3 is closed, a transistor 144 is supplied at its emitter terminal with a voltage through a light emitting diode 4 serving as a charge lamp and a current limit resistor 115. In this case, since a transistor 133 is applied at its base terminal with the battery voltage through a resistor 148, the transistor 133 is in a conductive state. Thus, since the transistor 144 is also made conductive, a transistor 122 is supplied with a base current through a resistor 146, so that a transistor 110 is turned on. In accordance with the turning-on of the transistor 110, a transistor 101 is supplied with a base current through a resistor 104 and so turned on. As a result, a rotor coil 201 is supplied with a field current, whereby the vehicle generator 2 is placed in a state of capable of generating electric power.

In this case, the light emitting diode 4 is lightened by the base current of the transistor 122 flowing through the resistor 146 and the collector current of the transistor 133 flowing through a resistor 147.

When the vehicle generator 2 starts the electric power generation operation, like the first embodiment, since the output of a comparator 109 is changed from a low level to a high level, a transistor is turned on, so that a transistor 133 is turned off. Thus, since the transistor 144 is also turned off, the current having been supplied to the base electrode of the transistor 122 is cut off, whereby the light emitting diode 4 is turned off.

Further, when the transistor 122 is turned off, the transistor 110 is also turned off, whereby the circuit for supplying the base current for the transistor 101 is shut down or made inoperable. Thus, after the vehicle generator 2 starts the electric power generation operation, a transistor 131 is turned on by the output of the comparator 109 thereby to turn on the transistor 110, whereby the circuit for supplying the base current for the transistor 101 is kept to be operable to maintain the supply of the base current.

Since the voltage control operation of the voltage control apparatus of this embodiment is same as that of the first embodiment, the explanation of the voltage control operation of the voltage control apparatus of this embodiment will be omitted.

As described above, according to the voltage control apparatus for a vehicle generator of the third embodiment, the circuit for detecting the voltage of the input terminal L and starting the voltage control apparatus is arranged to be shutdown or inoperable after the vehicle generator starts the electric power generation operation. Thus, this embodiment can prevent the occurrence of such a phenomenon that the light emitting element is kept in a lightened state by the current for starting the operation of the voltage control apparatus which flows into the voltage control apparatus from the input terminal L through the light emitting element driven with a low dissipation power.

Fourth Embodiment

The fourth embodiment is arranged in a manner that in the voltage control apparatus for a vehicle generator which has an input terminal L for inputting the voltage of a battery through an ignition switch and a light emitting element (light emitting diode etc.) connected in series with the ignition switch and driven by a low dissipation power and which starts its operation when the voltage at the input terminal L exceeds a predetermined value, the circuit for detecting the voltage of the input terminal L and starting the voltage control apparatus includes a field effect transistor.

Figure 5:
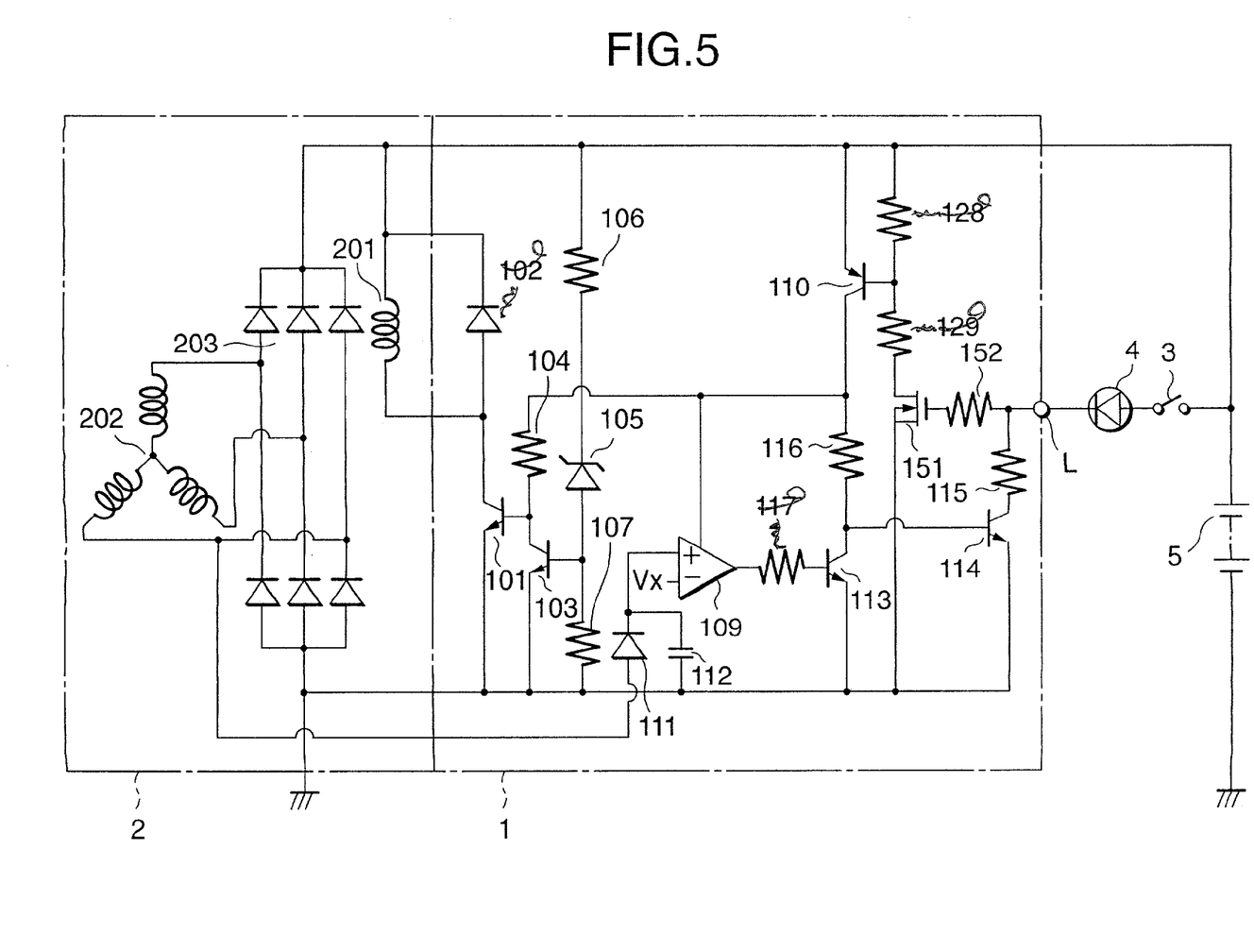
FIG. 5 is a circuit diagram showing a voltage control apparatus for a vehicle generator according to the fourth embodiment of the invention.

FIG. 5 is a circuit diagram showing the voltage control apparatus for a vehicle generator according to the fourth embodiment.

In FIG. 5, when an ignition switch 3 is closed, a field effect transistor (FET) 151 is supplied with a voltage through a light emitting diode 4 serving as a charge lamp and a resistor 152. A transistor 110 is also turned on the moment the FET 151 is turned on, and so transistors 101 and 114 are supplied with base currents through resistors 104 and 116, respectively. Thus, since the transistor 101 is turned on, a rotor coil 201 is supplied with a field current, so that a vehicle generator 2 is placed in a state of capable of generating electric power. Further, since the transistor 114 is also turned on, the light emitting diode 4 is lightened.

When the vehicle generator 2 starts the electric power generation operation, like the first embodiment, since the output of a comparator 109 is changed from a low level to a high level, a transistor 113 is tuned on, so that the transistor 114 is turned off. Thus, since the current having been supplied to the light emitting diode 4 is cut off, the light emitting diode 4 is turned off.

The starting circuit for the voltage control circuit 1 of the vehicle generator 2 includes the field effect transistor (FET) 151. Since the FET 151 does not require any current to be supplied to the gate circuit thereof, the FET 151 keeps the conductive state whilst the current does not flow through the resistor 152. Thus, the operation of the starting circuit can be maintained without erroneously lightening the light emitting diode 4.

Since the voltage control operation of the voltage control apparatus of this embodiment is same as that of the first embodiment, the explanation of the voltage control operation of the voltage control apparatus of this embodiment will be omitted.

As described above, according to the voltage control apparatus for a vehicle generator of the fourth embodiment, the circuit for detecting the voltage of the input terminal L and starting the voltage control apparatus includes the field effect transistor. Thus, this embodiment can prevent the occurrence of such a phenomenon that the light emitting element is kept in a lightened state by the current flowing into the voltage control apparatus from the input terminal L.

As described above, according to the invention in aspects 1 and 7, the resistor for limiting the current flowing through the light emitting element (light emitting diode etc.) driven with a low dissipation power is disposed between the input terminal and the element for driving the light emitting element within the voltage control apparatus.

Thus, the voltage control circuit is prevented from being broken even in an abnormal case that the output voltage of the battery etc. is directly applied to the input terminal, and the stable starting circuit for the voltage control circuit can be arranged with the simple configuration.

According to the invention in aspects 2, 3 and 7, the light emitting element (light emitting diode etc.) driven with a low dissipation power is lightened by a current itself which is inputted into the input terminal for starting the operation of the voltage control apparatus. Thus, a dedicated transistor etc. which has been employed merely to turning on and off the light emitting element can be eliminated and the light emitting element can be turned on and off with the simple circuit arrangement.

According to the invention in aspects 4, 5 and 7, the circuit for detecting the voltage of the input terminal and starting the voltage control apparatus is arranged to be shutdown or inoperable after the vehicle generator starts the electric power generation operation. Thus, the light emitting element can be prevented from being kept in a lightened state by the current for starting the operation of the voltage control apparatus which flows into the voltage control apparatus from the input terminal L through the light emitting element (light emitting diode etc.).

According to the invention in aspects 6 and 7, the circuit for detecting the voltage of the input terminal and starting the voltage control apparatus includes the field effect transistor. Thus, there is no current for starting the operation of the voltage control apparatus which flows into the voltage control apparatus from the input terminal L through the light emitting element (light emitting diode etc.). Accordingly, the light emitting element is prevented from being kept in a lightened state by the current flowing into the voltage control apparatus from the input terminal.

What is claimed is:

1. A voltage control apparatus for a vehicle generator comprising:
    an input terminal for inputting a voltage of a battery through an ignition switch and a light emitting element connected in series with said ignition switch,
    a rotor coil of said vehicle generator started in excitation when a voltage at said input terminal exceeds a predetermined value, and
    a resistor for limiting a current flowing through said light emitting element, disposed between a transistor within said voltage control apparatus for lighting said light emitting element, and said input terminal,
    wherein no other transistor is disposed between said transistor and said light emitting element.

2. The voltage control apparatus for a vehicle generator according to claim 1, wherein
    a light emitting diode is used as said light emitting element.

3. A voltage control apparatus for a vehicle generator comprising:
    an input terminal for inputting a voltage of a battery through an ignition switch and a light emitting element connected in series with said ignition switch, and a rotor coil of said vehicle generator started in excitation when a voltage at said input terminal exceeds a predetermined value, wherein;

said light emitting element is lighted by a current which is inputted into said input terminal for starting an operation of said voltage control apparatus; and wherein said light emitting element is coupled through said ignition switch to a base terminal of an NPN transistor for starting an operation of said voltage control apparatus so that said light emitting element is turned on by a current flowing into said base terminal.

4. A voltage control apparatus for a vehicle generator comprising:

an input terminal for inputting a voltage of a battery through an ignition switch and a light emitting element connected in series with said ignition switch, a rotor coil of said vehicle generator started in excitation when a voltage at said input terminal exceeds a predetermined value, and a circuit for detecting the voltage of said input terminal and starting said voltage control apparatus, said circuit being arranged to be shutdown after said vehicle generator starts electric power generation operation; and wherein after said circuit for detecting the voltage of said input terminal and starting said voltage control apparatus is shutdown after said vehicle generator starts electric power generation operation, an operation of a starting circuit for said voltage control apparatus is maintained by an output of one phase of said vehicle generator.

* * * * *